June 1, 1971  HOZUMI TANAKA ET AL  3,582,286
CRYSTALLIZER
Filed July 21, 1967

INVENTORS
H. TANAKA
M. HANAHUSA
S. KAJIHARA
Y. UNNO

BY Wenderoth, Lind & Ponack
ATTORNEYS

United States Patent Office 3,582,286
Patented June 1, 1971

3,582,286
CRYSTALLIZER
Hozumi Tanaka, Ashiya-shi, Minoru Hanahusa, Takarazuka-shi, and Sadaji Kajihara and Yutaka Unno, Osaka-shi, Japan, assignors to Shionogi & Co., Ltd., Osaka, Japan
Filed July 21, 1967, Ser. No. 655,135
Claims priority, application Japan, July 23, 1966,
41/70,068
Int. Cl. B01d 9/02
U.S. Cl. 23—273
1 Claim

ABSTRACT OF THE DISCLOSURE

Crystallizing ability of conventional crystallizer comprising a mixing barrel into which a solution of substance sought to be crystallized in the first solvent which is easily decomposable by the second solvent whose solvent power against said substance is relatively poor and said second solvent are concurrently fed, the slurry formed by said decomposition of said first solvent is continuously discharged, is much improved by the provision of an agitator having an impeller of maximum agitation at the proximity of the level of the liquid inside said mixing barrel.

---

Figure 1:
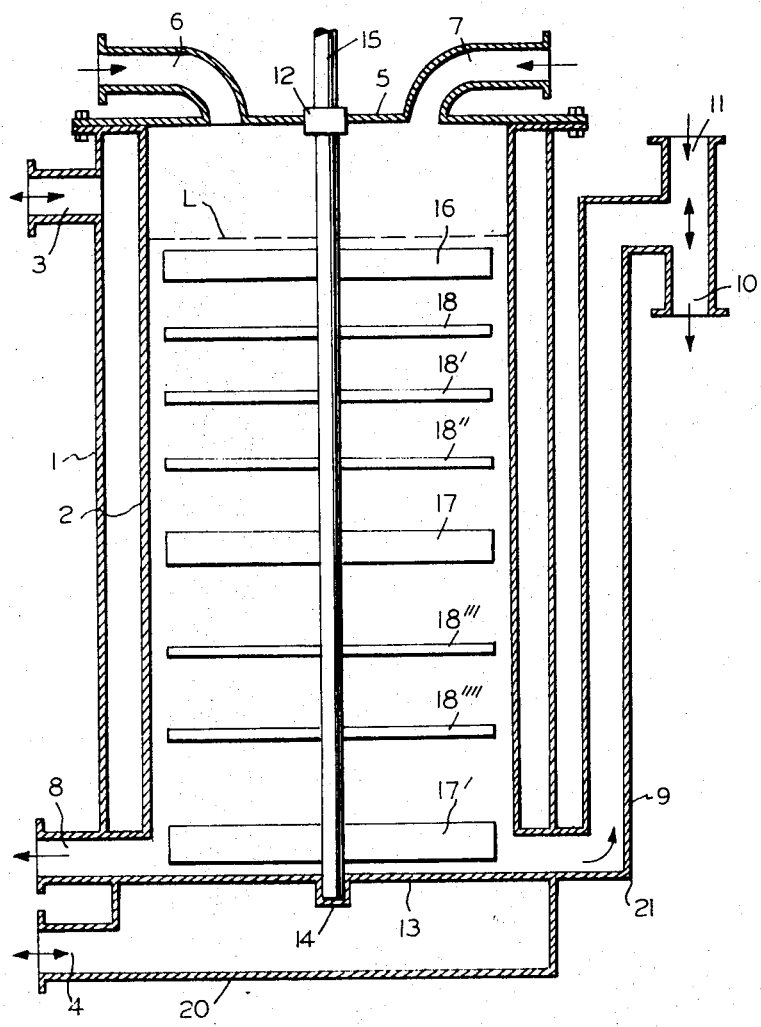

The present invention relates generally to crystallizer, particularly it concerns with an improvement in an apparatus by which a substance that is hardly soluble in water is crystallized from a solution in a solvent which is easily decomposed by the addition of water.

There has hitherto been known as a conventional crystallizing procedure for such substance dissolved in an excess reactant employed in a preceding step or dissolved in a solvent which has a sufficient solubilizing ability on said substance, a method of decomposing said excess reactant or reducing said solubilizing ability by introducing another solvent or reactant which hardly solubilizes said substance into the system.

For example, N-acetylsulfonylchloride which is an intermediate for synthesizing sulfonamide pharmaceuticals can be produced by chlorosulfonating acetoanilide, and is being dissolved in chlorosulfonic acid which is excessively present in the solution during and after said sulfochlorinating reaction and can be crystallized by decomposing said excess chlorosulfonic acid by introducing cool water into said solution, moreover the N-acetylsulfonylchloride thus crystallized can be purified by phase conversion effected by the introduction of other solvent, and these are expediently termed as "crystallization by phase conversion."

As aforementioned, the cool water or other second solvent introduced into the solution has a function of decomposing the first solvent or effecting phase conversion. In order to decompose the first solvent or to effect phase conversion, the solution must be mixed well with the second solvent employing, for example, an intense agitation which is inevitably accompanied by sometimes undesirable solvolysis such as hydrolysis of obtained crystal by the second solvent.

Therefore it is essential for such crystallization process either to minimize the period of time the crystallized substance lodges in the crystallizing vessel after the crystallization is completed or to employ cooled second solvent for decreasing the solubility of the formed crystal in said second solvent or to perform the crystallizing process in an apparatus with special cooling system.

On the other hand, it is not preferable to perform crystallization in a needlessly cooled apparatus because the lower the temperature of the second solvent, or in general, the temperature of the system, the finer the formed crystal and the fine crystal sometimes need extra hours for separating operation by such as centrifugal separation or is apt to cake inside the apparatus and is very hard to handle in general.

Since this particular "crystallization by phase conversion" is neither an ordinal crystallization utilizing difference in solubilities of substance effected by temperature difference nor a crystallization by adiabatic condensation, a conventional crystallizer such as "Swanson-walker" type or a vacuum evaporator cannot advantageously be employed.

The object of the present invention is to provide an apparatus for crystallization that is characterized by the short lodging period of the slurry including formed crystal and by the coarse grain of obtained crystal, and further characterized by the saving of subsidiary materials, energy consumed and required labor power. This and other objects and attendant advantages of the present invention will be apparent to those who are conversant with the art to which this invention pertains by the following disclosure of the specification and appended claim taken with the illustration of the accompanying drawing which is composed of sectional view of an embodiment of the present invention and schematic view of its principal components.

Figure 2:
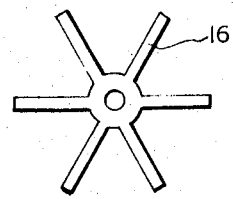
Figure 3:
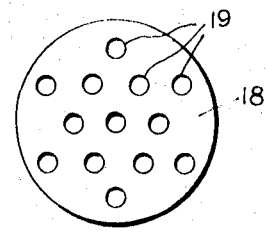
Figure 4:
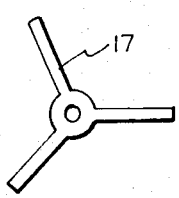

FIG. 1 shows a vessel with an agitator axis having 3 impellers thereon.
FIG. 2 shows the upper impeller having 6 arms thereon.
FIG. 3 shows the baffle members between impellers.
FIG. 4 shows the intermediate and lower impeller with 3 arms thereon.

An annular cylindrical space defined by outer pipe 1, inner pipe 2, top lid 5 and bottom lid 20 forms a jacket for heat exchange medium into which the medium is introduced and discharged through top and bottom openings 3, 4. Into the inner pipe 2, the mother liquid including substance to be crystallized and the second solvent are introduced through inlets 6 and 7 respectively. In the bottom of the inner pipe, there is provided an additional outlet 8 for slurry and an outlet 21 for discharging the liquid to to an overflow pipe 9 coupled with an outlet for discharging the liquid to the next step and a vent 11 for escaping gas. The overflow pipe 9 serves to maintain the level of the liquid inside the inner pipe 2 constant. On the other hand, there is provided an agitating axis 15 rotatable by an outside driving mechanism (not shown) being supported by a center bearing 12 on the top lid 5 and a thrust bearing 14 on the bottom lid 13, having an impeller of maximum agitation 16 shown as a hexagram, at the proximity of the level of the liquid, two impellers 17, 17' of medium ability of agitation at the proximity of bottom and in the middle of the axis and a plurality of baffles 18–18'''' each having a plurality of openings 19 inbetween each impeller (three and two baffles are provided inbetween the upper and middle impeller and inbetween the middle and bottom blade respectively in the drawing) which serves the agitation and sequential transferring of the liquid.

In an apparatus thus comprised, the mother liquid and the second solvent introduced through two inlet openings 6, 7 are immediately mixed with each other in the proximity of the level L of the liquid and the crystallization is initiated at this part of the vessel. Since the agitating ability of the impeller 16 is large enough to suppress the caking of the substance crystallized at this portion, the mother liquid, product formed by the decomposition (in case of the second solvent can decompose the first solvent) and formed crystal are mixed well. The mixture is transferred down while being adjusted to its descending velocity by the action of baffles 18, 18', 18", agitated by the second impeller 17 and thereafter reach the bottom as aforementioned. At this portion of the vessel, the mixture is subjected to a sufficient mixing by the third impeller 17' and thereafter led to a succeeding step, for example a separating step, through the outlet 21 and the overflow pipe 9 coupled with outlet 21 and the overflow pipe 10. Although it is the essential requirement for embodying the present invention to impart the first impeller the maximum agitating ability, number, structure and arrangement of the other impellers and baffles may arbitrarily be selected in accordance with the specific requirement of the substance to be treated and another operative condition, and many other variance in number, structure and arrangement of such impellers and baffles should be considered to be in the scope of the present invention.

Unless the sufficient agitation effected in the proximity of the level, the mixture will descend rapidly and cake on the lower half of the agitator, and it will become very difficult to lead the mixture to the next step and even to rotate the axis smoothly.

Furthermore, by employing an apparatus illustrated in the drawing, a sufficient mixing which is effected during relatively short lodging period, enables the reduction in the extent of refrigeration and in the possible solvolysis (hydrolysis) of formed crystal which result in easiness of handling, for example, a large granular size of the crystal which facilitate the centrifugal separation of the treated mixture.

Thus, in the preferred embodiment depicted in FIG. 1, the agitator axis has three impellers distributed throughout the length of said axis, the upper impeller having six impeller arms thereon, the intermediate and lower impeller having three impeller arms thereon, and said axis having at last two baffle members positioned thereon in the spaces between the impellers, the baffles having plural openings distributed in the form of a six-pointed star.

The unique advantage inherent to the present invention will be understood more clearly by the following illustrative preparation.

Illustrative preparation

In the crystallizing process of N-acetylsulfonylchloride formed by reacting acetoanilide with chlorosulfonic acid as a mixture of above three component, comprising introduction of cool water, the operation employing the apparatus illustrated in the present invention is compared with a conventional batch operation.

In the operation employing the present apparatus which enables employment of higher crystallization temperature even in the crystallization of the N-acetylsulfonylchloride which is liable to be hydrolyzed because the present apparatus is capable of performing a continuous operation and is able to shorten the lodging period of crystal in the apparatus as compared to a batch operation.

As a result, it is enabled to raise the crystallizing temperature up to 40° C. whereas a crystallizing temperature below 0° C. (about −10° C.) is required for conventional operation which consumes much ice. The overall advantage obtained by employing the apparatus is summerized in an operation using 600 kg. of acetoanilide as follows;

(i) Reduction in required ice for cooling:
Batch operation—13,500 kg.
Continuous operation—1,800 kg.
Consumption ratio—1,800 kg./13,500 kg.=0.133

(ii) Reduction in operation period:
(a) Crystallization period.—The flow in velocity of the reactant mixture can be much accelerated because of its high crystallizing temperature and of the effective agitation, therefore only 7.5 hours are required for crystallization whereas 15 hours are required in a batch operation.
(b) Period of time required for centrifugal separation and for cake washing.—This period is much reduced because the large particular size of the crystal formed at relatively high temperature.

(iii) Reduction in floor space used for operation:
In batch operation, the operation was carried out by two units of 3000 I. crystallizing barrel but in continuous operation the same performance is expected by one unit of the apparatus (20 l.). Therefore much reduction in floor space and the utilization of the saved space for another purpose can be expected.

(i) Reduction in labor cost (manpower):
In batch operation, the crystallizing barrel is too bulky to handle easily, therefore many operators are required with an additional labor for crushing quantity of ice. Only 3 persons for maintaining and watching the apparatus are required for the present process whereas 9 operators capable of muscle labor are required in the batch process.

We claim:
1. In a crystallizer for a substance in solution in a first solvent that can be easily decomposed by the addition of a second solvent in which said substance is scarcely soluble; comprising a cylinder, the length thereof being at least twice as large as the diameter thereof and having inlets for said solution and said second solvent and an outlet for the slurry formed by the decomposition of said first solvent coupled with a means for maintaining the level of the liquid inside the cylinder constant, a jacket for heat exchange medium with an inlet and an outlet therefor, and an agitator axis mounted rotatably inside and coaxially with said cylinder having a plurality of agitating impellers and baffles, the improvement which comprises the provision of an impeller of maximum agitation ability on said axis at the proximity of said level of the liquid, said agitator axis having three impellers distributed throughout the length of the axis, the upper impeller having six impeller arms, the intermediate and lower impellers having three impeller arms thereon, at least two baffle members positioned on the axis in the spaces between the impellers, the baffles having plural openings distributed in the form of a six-pointed star.

References Cited
UNITED STATES PATENTS

| | | | |
|---|---|---|---|
| 2,626,786 | 1/1953 | McGlothlin | 259—8 |
| 2,738,255 | 3/1956 | Sullivan et al. | 23—59 |
| 2,813,851 | 11/1957 | McKay | 23—273X |

NORMAN YUDKOFF, Primary Examiner

R. T. FOSTER Assistant Examiner

U.S. Cl. X.R.
23—301, 267